(12) United States Patent
Zhu

(10) Patent No.: US 7,833,106 B2
(45) Date of Patent: Nov. 16, 2010

(54) DYNAMIC DECORATIVE PAINTING

(76) Inventor: Shiqi Zhu, 241 E. German School Rd., Richmond, VA (US) 23224

( * ) Notice: Subject to any disclaimer, the term of this patent is extended or adjusted under 35 U.S.C. 154(b) by 350 days.

(21) Appl. No.: 12/010,982

(22) Filed: Jan. 31, 2008

(65) Prior Publication Data
US 2009/0197729 A1    Aug. 6, 2009

(51) Int. Cl.
*A63J 5/02* (2006.01)
*G09F 11/12* (2006.01)
(52) U.S. Cl. .......................... 472/65; 40/472
(58) Field of Classification Search .................. 472/59, 472/65, 67, 136, 137; 40/427, 472, 473
See application file for complete search history.

(56) References Cited

U.S. PATENT DOCUMENTS

| 4,333,255 | A | * | 6/1982 | Ward .......................... 40/524 |
| 5,072,533 | A | * | 12/1991 | Heinz et al. ................... 40/518 |
| 6,055,753 | A | * | 5/2000 | Sondericker, III ............ 40/471 |
| 7,155,848 | B2 | * | 1/2007 | O'Malley et al. ............. 40/472 |
| 7,497,039 | B2 | * | 3/2009 | Zhu et al. ..................... 40/472 |

* cited by examiner

*Primary Examiner*—Kien T Nguyen
(74) *Attorney, Agent, or Firm*—John S. Hale; Gipple & Hale

(57) ABSTRACT

The invention is directed toward an electro-mechanical simulated aquarium. It includes a novel combination of a planetary gear train driving two endless loops of transparent material in counter-rotating directions. Depictions of marine life are applied to the loops and the entire arrangement is housed in an aquarium-like enclosure in order to maximize its realism.

17 Claims, 5 Drawing Sheets

DYNAMIC DECORATIVE PAINTING

RELATED APPLICATIONS

There is no related application.

STATEMENT REGARDING FEDERALLY SPONSORED RESEARCH OR DEVELOPMENT

Not applicable.

REFERENCE TO SEQUENCE LISTING, A TABLE OR A COMPUTER PROGRAM LISTING COMPACT DISC APPENDIX

None.

BACKGROUND OF THE INVENTION

1. Field of Invention

The present invention is generally directed toward a decorative object, more particularly, it is a decorative object simulating the appearance and motion of an aquarium.

2. Background of the Invention

This early part of the $21^{st}$ century has been a particularly remarkable time in history. We are in the midst of a technological revolution and each succeeding week brings with it increasingly sophisticated devices that permit us to be evermore productive. However, while increasing technology has in many respects made our lives easier, the availability of so much information and the ability to work twenty-four hours per day has also resulted in an unprecedented degree of stress experienced by an exponentially growing number of Americans.

Reducing this stress has recently become an industry in and of itself. Spas have become prevalent and various devices are now available to massage or otherwise "melt" that stress away. However, long before the availability of the technological wizardry we have today, generations of Americans have found the simple act of watching fish swim in a home aquarium to be a wonderful way to "wind down" after a long, stressful day. Unfortunately, unless one has the financial resources to pay someone to maintain that tank, cleaning the tank, changing its water, feeding the fish, and all the other too numerous requirements of keeping the fish healthy can itself become an onerous task.

What is needed is a way to combine the technology available to us today with the old fashioned concept of relaxing in front of an aquarium. Such a device would ideally eliminate the difficult and time-consuming elements of aquarium ownership while nevertheless permitting the user to enjoy the soothing, stress-reducing experience offered by a traditional aquarium.

It is now feasible to create an electro-mechanical aquarium, and although previous attempts have been made, all previous versions have been economically impractical or unrealistic in its depiction of a marine tableu.

SUMMARY OF THE INVENTION

The subject invention is an electro-mechanical simulation of an aquarium including a novel combination of a planetary gear train driving two endless loops of transparent material in counter-rotating directions. Depictions of marine life are applied to the loops and the entire arrangement is housed in an aquarium-like enclosure in order to enhance its verisimilitude. In a preferred embodiment, cartoon-like depictions of marine life are used in lieu of more photorealistic representations in order to create a more whimsical, and therefore more relaxing, effect.

Previously known electro-mechanical aquariums are limited to a single endless loop of material driven via an electric motor and reduction drive arrangement. Where multiple endless loops are desired in order to enhance the realism of the arrangement, multiple motors and reduction drives are required, with each loop having its own dedicated drive motor. Moreover, these multi-motor arrangements are necessarily bulky and unlike true aquariums, require significant amounts of distracting opaque material in order to disguise their interior mechanisms. These multi-motor arrangements are also inherently more expensive in comparison to the instant invention.

It is therefore an object of this invention to provide a realistic, simulated aquarium conducive to promoting relaxation.

Accordingly, it is another object of this invention to enhance the realism of a simulated aquarium environment including two counter-rotating endless loops of material with marine scenes depicted thereon.

It is also an object of this invention to further enhance the realism of a simulated aquarium environment by minimizing the size the working mechanisms therein and thereby minimize the exterior fascia required to hide the aforementioned mechanisms.

It is yet another object of this invention to minimize the cost of producing a realistic, simulated aquarium.

These and other objects, advantages, and novel features of the present invention will become apparent when considered with the teachings contained in the detailed disclosure along with the accompanying drawings.

DESCRIPTION OF THE INVENTION

The preferred embodiments and best modes of the invention are shown in FIGS. 1 through 5. While the invention is described in connection with certain preferred embodiments, it is not intended that the present invention be so limited. On the contrary, it is intended to cover all alternatives, modifications, and equivalent arrangements as may be included within the spirit and scope of the invention as defined by the appended claims.

The invention may be constructed from any moldable material, but in a preferred embodiment, is constructed from plastic, including but not limited to various nylon formulations, polyvinyl chloride, polyethylene, polyfluoroethylene, polypropylene, polymethyl methacrylate, and other acrylics, silicones, polyurethanes, or their composites.

Figure 1:
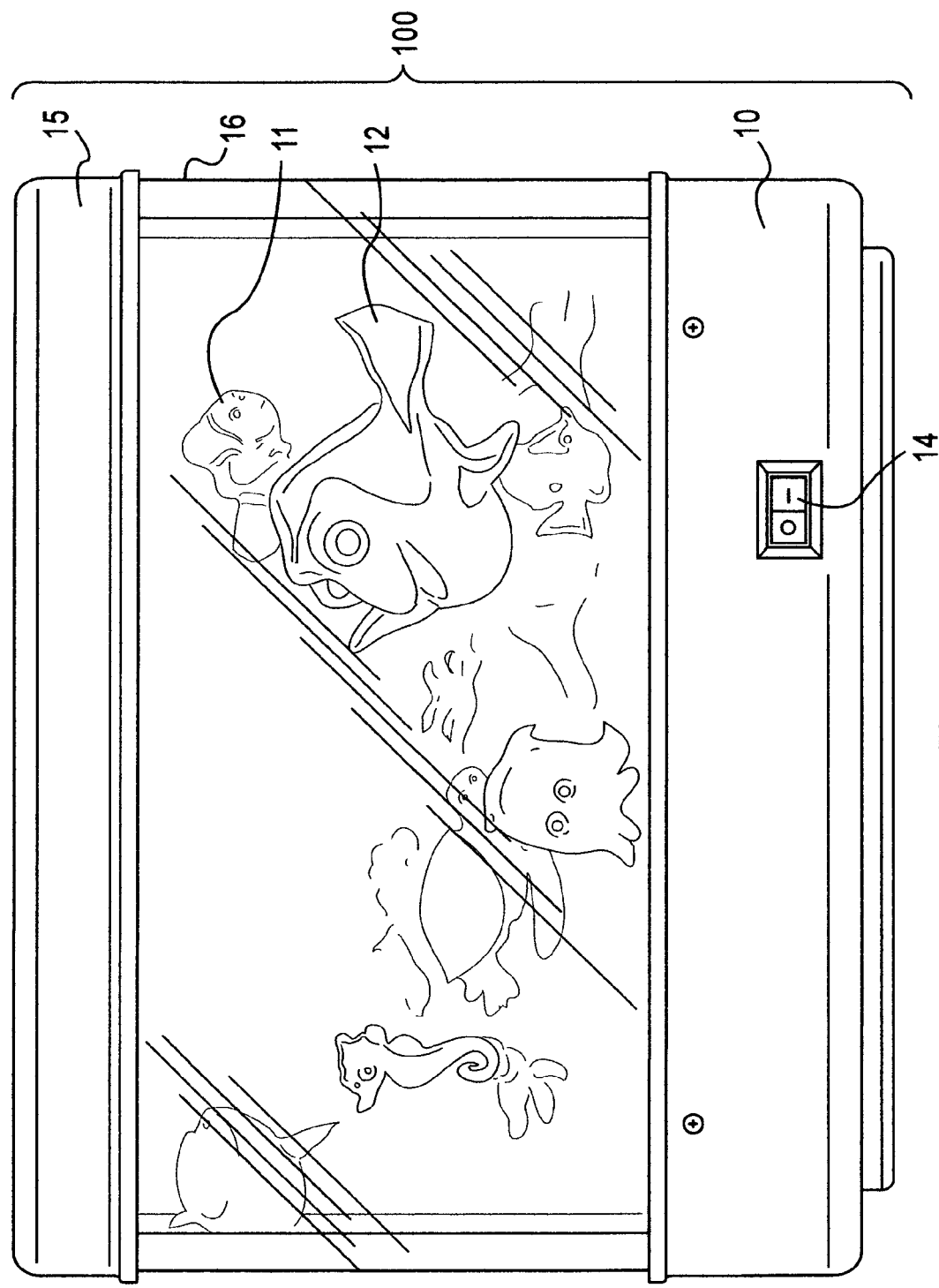
FIG. 1 is an elevation of a preferred embodiment

FIG. 1 is an elevation view of the instant invention 100. A power switch 14 is mounted to the base 10 for operation of the invention, with the base 10 holding the electro-mechanical mechanisms therein, an encircling lens 16 mounted to the base protects the interior from damage while simulating the transparent sidewalls of an actual aquarium, and a top cover 15. In this preferred embodiment, the invention is generally parallelepiped. In an alternate embodiment, various curvatures, for example, convex, concave, or undulating surfaces may be molded into or embossed into the encircling sidewall lens 16 to affect the light transmissive qualities of the lens 16 and therefore the appearance of objects viewed therethrough.

Figure 2:
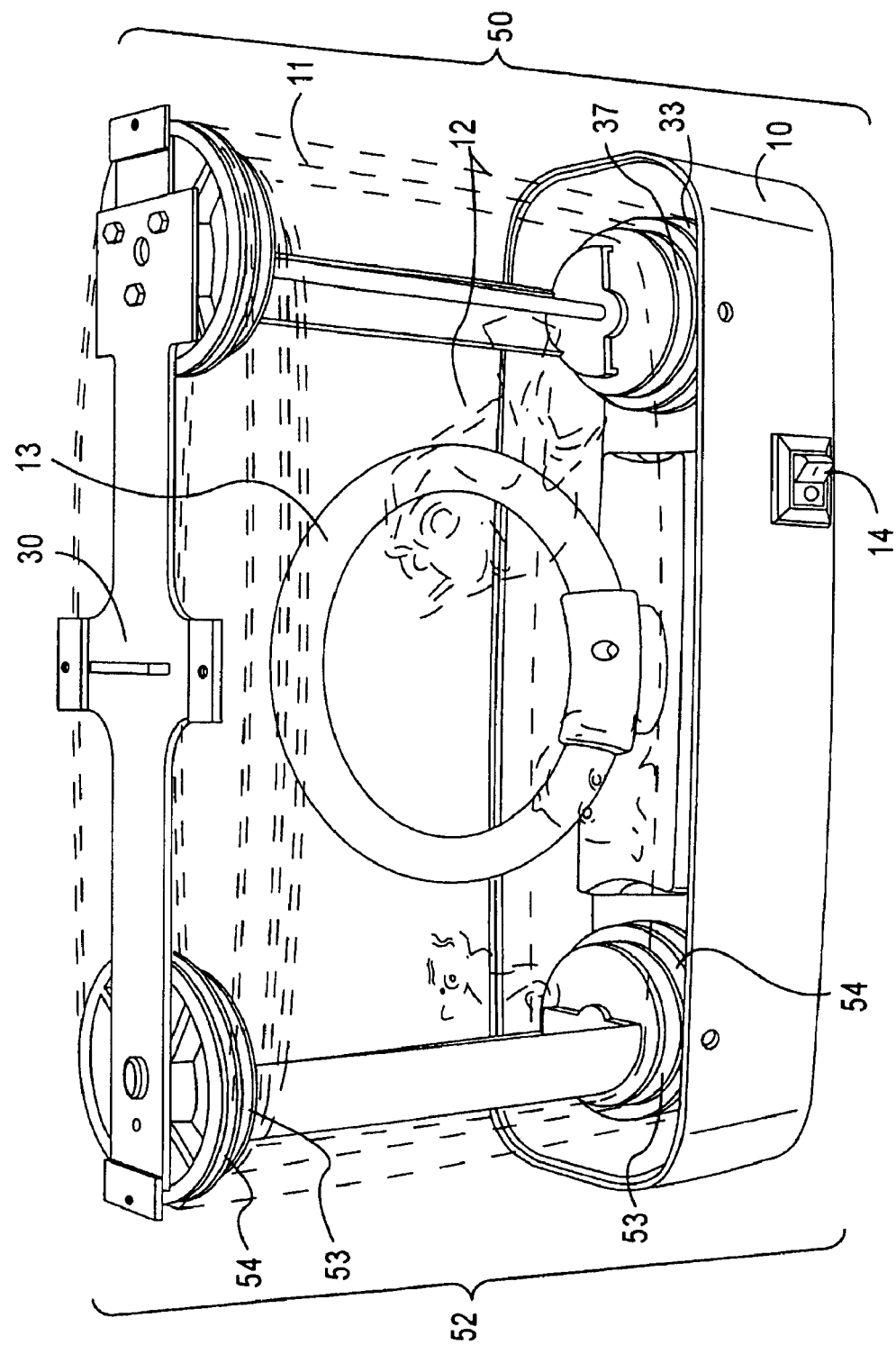
FIG. 2 is front perspective of a preferred embodiment with cover removed and its two endless loops in phantom

Referring now to FIG. 2, the preferred embodiment is shown with its top cover 15 and encircling lens 16 removed. First and second endless loops 11, 12 are shown in phantom, as are the depictions of marine life applied on the endless loops. A drive mechanism 50 containing a planetary gear train (not visible) is mounted at one end of the base with an axis of rotation generally perpendicular to the base. In use, torque applied to the planetary gear train by a drive motor (not shown) causes counter-rotation of the first endless loop bearing element 37 and second endless loop bearing element 33. First and second endless loops 11, 12 are in functional engagement with the first and second endless loop bearing elements 37, 33 and are therefore caused to move in counter-rotating directions. An undriven freewheeling mechanism 52 with a first endless loop bearing surface 53 and an undriven freewheeling mechanism second endless loop bearing surface 54 is disposed on the base at an end opposite from the drive mechanism 50 and maintains tension on the first and second endless loops 11, 12. Means for illuminating the loops 11, 12 is in the form of a fluorescent lamp 13 is mounted to the base 10. Those skilled in the art will recognize that other methods of illumination are available, including light emitting diodes (LEDs) and incandescent fixtures. The distal ends of the drive mechanism 50 and undriven freewheeling mechanism are mounted to the drive mechanism carrier 30 to ensure the stability of these components.

Figure 3:
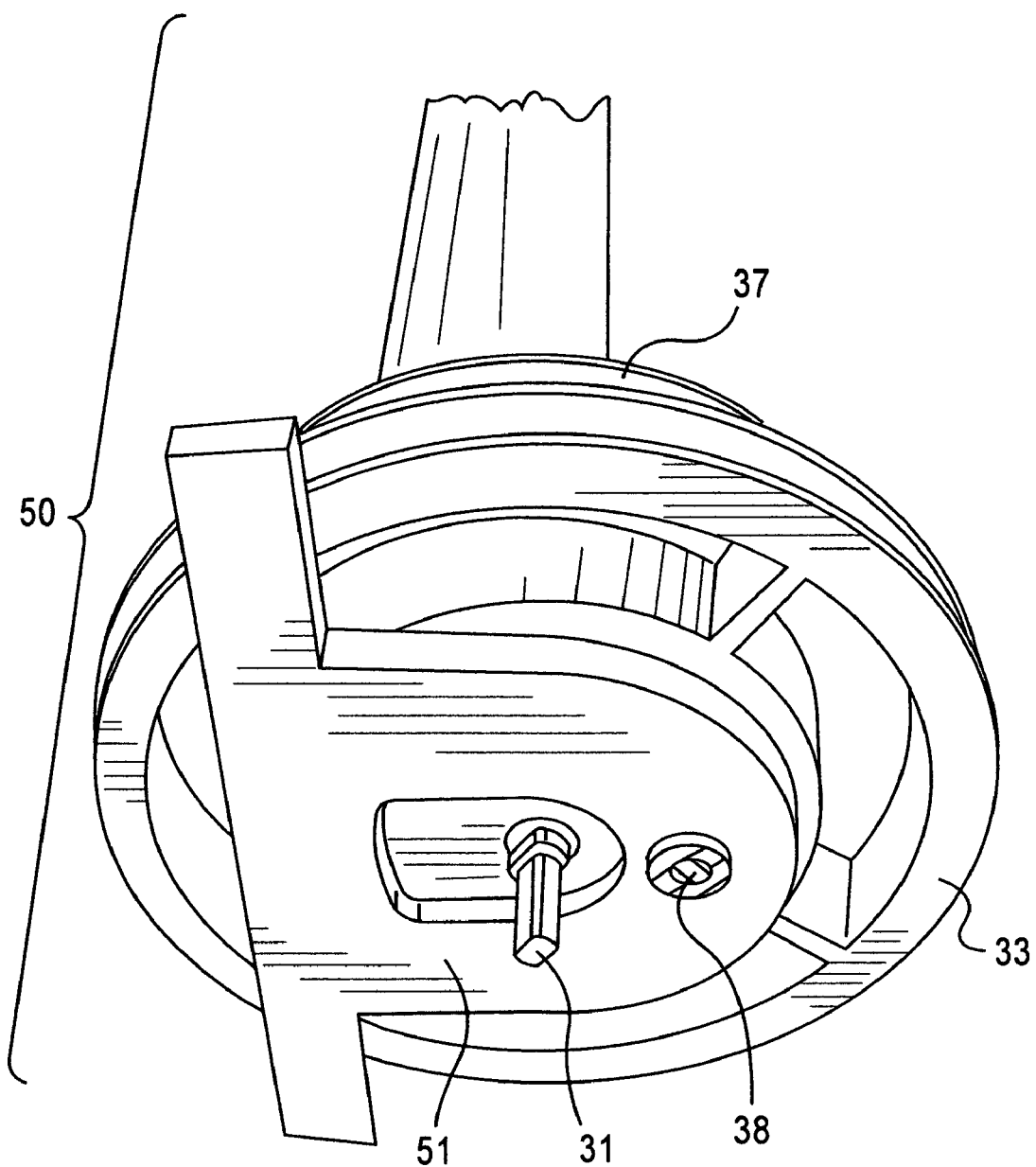
FIG. 3 is a detailed perspective view of the planetary gear drive

FIG. 3 is a detailed perspective view of the drive mechanism 50 of the current invention, including its cover 51 and first and second endless loop bearing elements 37, 33. A drive axel 31 is shown whereby torque applied by the motor (not shown) is transmitted to the gear train. A planetary gear fixing pin 38 prevents orbital rotation of the aforementioned gear about the sun gear but does not impede rotation about its axis.

Figure 4:
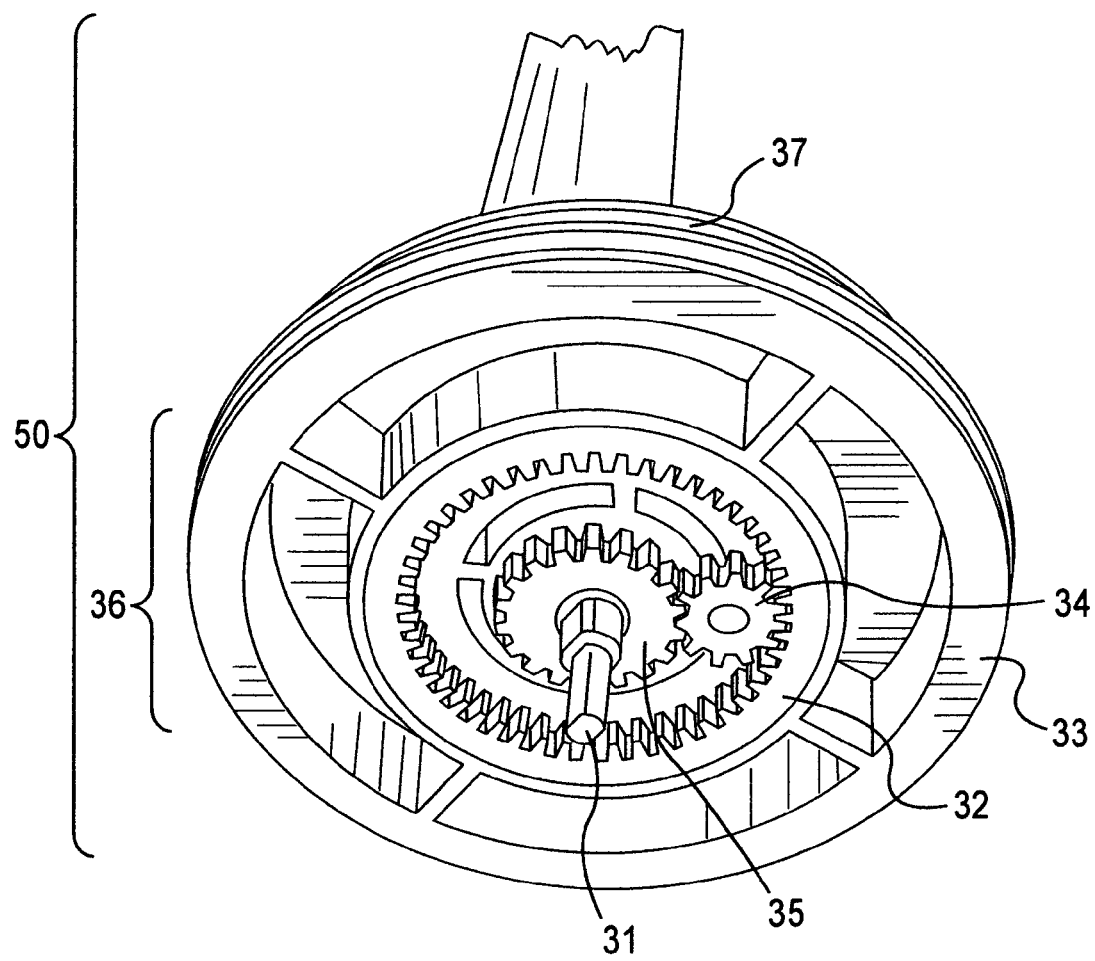
FIG. 4 is a detailed perspective view of the planetary gear drive with its cover removed

Operation of the planetary gear train 36 is depicted in FIG. 4, showing the mechanism in FIG. 3 with its cover removed. In use, torque is applied by the drive motor (not shown) through the drive axel 31 thereby turning it in one direction. The sun gear 35 and first endless loop bearing element 37 are in fixed communication with the drive axel 31 and are therefore caused to rotate in the same direction. At the same time, torque is transmitted from:

1. the sun gear 35 to the planetary gear 34 thereby causing counter-rotation relative to the movement of the sun gear 35, and
2. from the planetary gear 34 to the ring gear 32 thereby causing rotation of the ring gear 32 in the same direction as the planetary gear 34.

The second endless loop bearing element 33 is in direct communication with the ring gear 32 and therefore is caused to rotate in a direction opposite that of the first endless loop bearing element 37. First and second endless loops 11, 12 are in communication with the first and second endless loop bearing elements 37, 33 and are counter-rotated accordingly.

Figure 5:
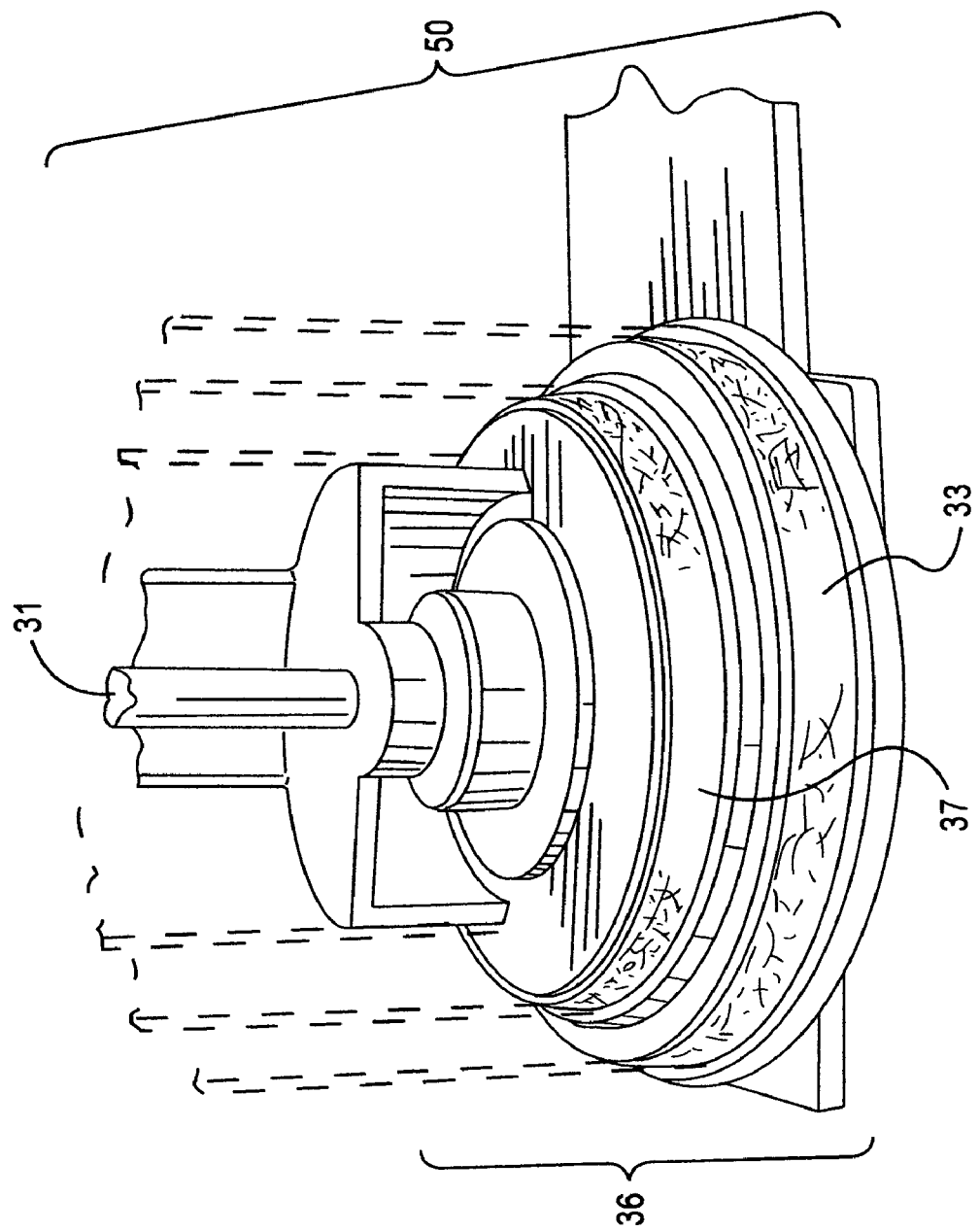
FIG. 5 is a detailed perspective view of the planetary gear drive in depicted in FIGS. 3 & 4, viewed at a rotation of approximately 90 degrees.

FIG. 5 is a detailed perspective view of the drive mechanism in FIGS. 3 and 4 at an angle advantageously depicting the first and second endless loop bearing surfaces 37, 33. Note also the drive axel 31 transecting the planetary gear train 36.

In operation, the invention is activated by operation of the power switch 14, thereby energizing the drive motor (not shown) and causing the drive axel 31 mounted thereon to rotate in one direction. The sun gear 35 of the planetary gear train 36 and first endless loop bearing element 37 are in fixed communication with the drive axel 31 thereby causing rotation of the first endless loop 11 in the same direction as the drive motor (not shown). The sun gear 35 simultaneously turns the planetary gear 34, which in turn causes rotation of the ring gear 32 in a direction counter to the rotation of the sun gear 35. The second endless loop bearing element 33 is in direct communication with the ring gear 32, thereby causing rotation of the second endless loop 12 in a direction counter to the rotation of the first endless loop 11.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims:

What is claimed is:

1. A decorative object comprising:
    a base having a drive mechanism mounted thereon, said drive mechanism having a first axis of rotation generally perpendicular to said base;
    said base having a complimentary undriven freewheeling mechanism mounted thereon, said freewheeling mechanism having a second axis of rotation generally perpendicular to said base and generally parallel to said first axis of rotation of said drive mechanism;
    a first endless loop of transparent material having a decorative design applied thereon having a first interior surface and a first exterior surface, said first interior surface being in communication with said drive mechanism and said freewheeling mechanism, and said first endless loop being rotatably drivable in one direction by said drive mechanism; and,
    a second endless loop of transparent material having a decorative design applied thereon having a second interior surface and a second exterior surface, said second endless loop being disposed externally to said first endless loop with said first external surface of said first endless loop generally adjacent to but not in contact with said second interior surface of said second endless loop, said second interior surface in communication with said drive mechanism and said freewheeling mechanism, and said second endless loop being rotatably drivable by said drive mechanism in a direction opposite that of said first endless loop.

2. A decorative object as in claim 1 wherein a background material is disposed internally of said first endless loop, said background material being adjacent to but not in contact with said first interior surface of said first endless loop.

3. A decorative object as in claim 2 wherein said background material is light permeable and illuminating means are disposed internally relative to said background material.

4. A decorative object as in claim 1 wherein said illuminating means is a fluorescent lamp.

5. A decorative object as in claim 4 wherein said fluorescent lamp is a circular fluorescent lamp.

6. A decorative object as in claim 1 wherein said first and second endless loops include depictions of marine flora, fauna, or flora and fauna, and the decorative object simulates an aquarium.

7. A decorative object as in claim 1 wherein said drive mechanism is a planetary drive mechanism.

8. A decorative object as in claim 1 wherein an encircling lens is mounted to said base.

9. A decorative object as in claim 8 wherein said encircling lens has an undulating surface.

10. A decorative object comprising:

a base having a drive mechanism mounted thereon;

said drive mechanism including a drive means and a planetary gear train mounted thereon, said planetary gear train comprising a sun gear, a fixed planetary gear, and a ring gear;

said drive means being in communication with said sun gear, said sun gear being in communication with said fixed planetary gear, and said fixed planetary gear being in communication with said ring gear;

said drive mechanism having a first axis of rotation generally perpendicular to said base;

said base having a complimentary undriven freewheeling mechanism mounted thereon, said freewheeling mechanism having a second axis of rotation generally perpendicular to said base and generally parallel to said first axis of rotation of said drive mechanism;

a first endless loop of transparent material having a decorative design applied thereon having a first interior surface and a first exterior surface, said first interior surface in communication with said drive mechanism and said freewheeling mechanism, and said first endless loop being rotatably drivable in the same direction as said sun gear; and, a second endless loop of transparent material having a decorative design applied thereon having a second interior surface and a second exterior surface, said second endless loop being disposed externally to said first endless loop with said first external surface of said first endless loop generally adjacent to but not in contact with said second interior surface of said second endless loop, said second interior surface in communication with said drive mechanism and said freewheeling mechanism, and said second endless loop being rotatably drivable by said ring gear in a direction opposite that of said first endless loop.

11. A decorative object as in claim 10 wherein an encircling lens is mounted to said base.

12. A decorative object as in claim 11 wherein said encircling lens has an undulating surface.

13. A decorative object as in claim 10 wherein said drive means is an electric motor.

14. A decorative object as in claim 10 wherein a background material is disposed internally of said first endless loop, said background material being adjacent to but not in contact with said first interior surface of said first endless loop.

15. A decorative object as in claim 14 wherein said background material is light permeable and illuminating means is disposed internally relative to said background material.

16. A decorative object as in claim 15 wherein said illuminating means is a circular fluorescent lamp.

17. A decorative object as in claim 14 wherein said first and second endless loops include depictions of marine flora, fauna, or flora and fauna, and the decorative object simulates an aquarium.

\* \* \* \* \*